United States Patent
Salgues et al.

(10) Patent No.: US 9,745,044 B2
(45) Date of Patent: Aug. 29, 2017

(54) AIRCRAFT INCLUDING A SUPPORT DEPLOYABLE OUTSIDE THE FUSELAGE

(71) Applicant: Airbus Operations (SAS), Toulouse (FR)

(72) Inventors: Patrick Salgues, Toulouse (FR); Anne-Laure Neveu, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 199 days.

(21) Appl. No.: 14/680,346

(22) Filed: Apr. 7, 2015

(65) Prior Publication Data

US 2015/0284066 A1    Oct. 8, 2015

(30) Foreign Application Priority Data

Apr. 8, 2014 (FR) ...................... 14 53093

(51) Int. Cl.
*B64C 1/14* (2006.01)

(52) U.S. Cl.
CPC .......... *B64C 1/1461* (2013.01); *B64C 1/1407* (2013.01)

(58) Field of Classification Search
CPC ............................ B64C 1/1407; B64C 1/1461
See application file for complete search history.

(56) References Cited

U.S. PATENT DOCUMENTS

| | | | | |
|---|---|---|---|---|
| 2,748,855 A | * | 6/1956 | Siems ................... | B64C 1/1407 160/180 |
| 5,180,199 A | * | 1/1993 | Teichmann ........... | B64C 1/1407 292/259 R |
| 5,255,946 A | | 10/1993 | Allerding et al. | |
| 2005/0166983 A1 | | 8/2005 | Shaw et al. | |

FOREIGN PATENT DOCUMENTS

FR    2979898    3/2013

OTHER PUBLICATIONS

French Search Report, Dec. 5, 2014.

\* cited by examiner

*Primary Examiner* — Philip J Bonzell
(74) *Attorney, Agent, or Firm* — Greer, Burns & Crain, Ltd.

(57) ABSTRACT

An aircraft including a fuselage with a skin in which is made an opening, the skin delimiting the interior and the exterior of the fuselage. A closure panel is mobile between a closed position in which the panel covers the opening and an open position in which the closure panel uncovers the opening. A support including a base is fastened to the fuselage. At least one bar and an articulation between the bar and the base allow the bar to occupy a position retracted inside the fuselage and a deployed position outside the fuselage. The articulation is a pivoting connection.

12 Claims, 3 Drawing Sheets

AIRCRAFT INCLUDING A SUPPORT DEPLOYABLE OUTSIDE THE FUSELAGE

CROSS-REFERENCES TO RELATED APPLICATIONS

This application claims the benefit of the French patent application No. 1453093 filed on Apr. 8, 2014, the entire disclosures of which are incorporated herein by way of reference.

BACKGROUND OF THE INVENTION

The present invention relates to an aircraft including a support deployable outside the fuselage in the vicinity of an emergency exit.

An emergency exit provided for evacuation of the cockpit of an aircraft includes an opening made in the fuselage of the aircraft and a closure panel that is removed from the opening in the event of an emergency evacuation. The closure panel is such that its exterior surface lines up with the exterior surface of the rest of the fuselage in order to reduce the impact on the aerodynamic characteristics.

The openings provided for the emergency exits are small so as not to weaken the structure of the aircraft too much.

In addition to the emergency exit, the aircraft includes a flexible element such as a rope or a flexible ladder, one end of which is fixed to the interior of the fuselage, and that is deployed outside the fuselage via the opening in the event of an emergency evacuation to enable persons to reach the ground.

These flexible elements are not practical to use.

For emergency exits located in the lower part of the fuselage, there is known from the document FR-2,979,898 a retractable rigid ladder that is deployed from the interior of the fuselage through the emergency exit opening. During deployment, the various rungs of the retractable ladder move in translation in the direction of the stiles of the ladder.

Even if this solution improves the ergonomics of the evacuation means, it is not suitable for emergency exits disposed in the upper part of the fuselage.

For such emergency exits, the persons have available only a rope or a flexible ladder. In practice, getting through the narrow emergency exit opening, while gripping the rope or the flexible ladder, proves to be the greatest problem, especially as the exterior surface of the fuselage around the opening is perfectly smooth for aerodynamic reasons and offers no grip.

The present invention aims to remedy the disadvantages of the prior art.

SUMMARY OF THE INVENTION

To this end, the invention comprises an aircraft including a fuselage with a skin in which is made an opening, the skin delimiting the interior and the exterior of the fuselage, a closure panel mobile between a closed position and an open position in which said closure panel uncovers the opening and a support including a base fastened to the fuselage, at least one bar and an articulation between said bar and said base allowing the bar to occupy a position retracted inside the fuselage and a position deployed outside the fuselage, wherein the articulation is a pivoting connection.

This configuration is suitable for all installation areas on the fuselage of an aircraft.

Moreover, it makes it possible to retain the largest possible opening.

The pivoting connection preferably has a pivot axis parallel to an exterior surface of the fuselage.

The support advantageously includes a locking system configured to occupy a locked state in which it immobilizes the bar in rotation and an unlocked state in which it allows the rotation of the bar.

The bar preferably includes a head connected to the base by the pivot, said head including at least one notch for the deployed position and the locking system preferably includes a lever with a projecting shape that cooperates with the notch of the head when the bar is in the deployed position, said lever being mobile between a position away from the head of the bar that corresponds to the unlocked state and a position in contact with the head of the bar.

The head advantageously includes at least one stop for the retracted position.

The locking system preferably includes a return spring tending to hold the lever in contact with the head of the bar.

In accordance with one embodiment, the lever is connected to the base by a hinge pin parallel to the pivot axis of the bar and the lever includes a lug with a first portion that extends in a direction parallel to the hinge pin, an intermediate portion that extends in a plane perpendicular to the hinge pin and an end that extends in a plane parallel to the hinge pin.

The pivot axis of the bar is advantageously between an exterior surface and an interior surface of the fuselage.

In accordance with one embodiment, the bar includes a head connected to the base by the pivot, a rectilinear first portion, a cranked second portion and a rectilinear third portion, the rectilinear first portion and the cranked second portion of the bar having dimensions and geometries such that the rectilinear third portion of the bar is parallel to the closure panel.

In accordance with another feature, the support is disposed in a corner of the opening.

BRIEF DESCRIPTION OF THE DRAWINGS

Other features and advantages will emerge from the following description of the invention given by way of example only with reference to the appended drawings, in which.

DETAILED DESCRIPTION OF THE PREFERRED EMBODIMENTS

Figure 1:
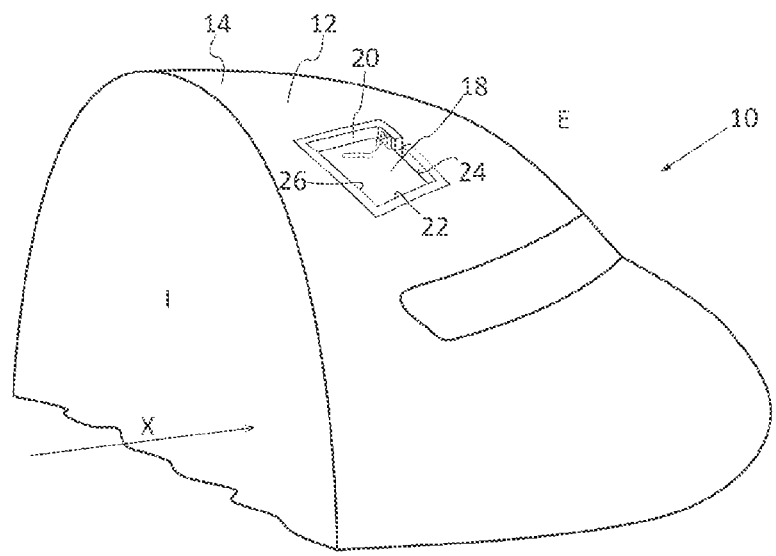
FIG. 1 is a diagrammatic representation in perspective of the upper part of the front end of the fuselage of an aircraft.
Figure 2A:
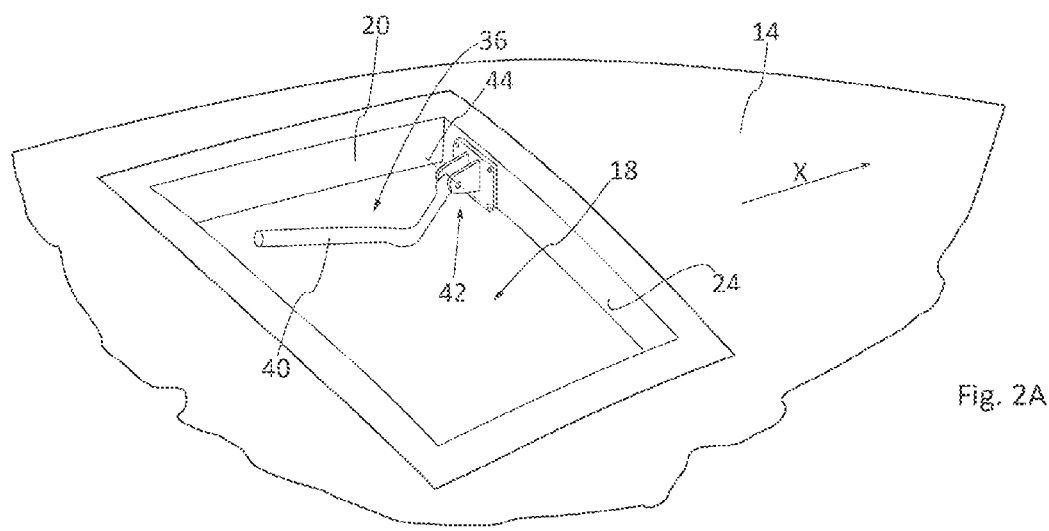
FIG. 2A is a diagrammatic representation in perspective of a support in a retracted position that illustrates the invention.
Figure 2B:
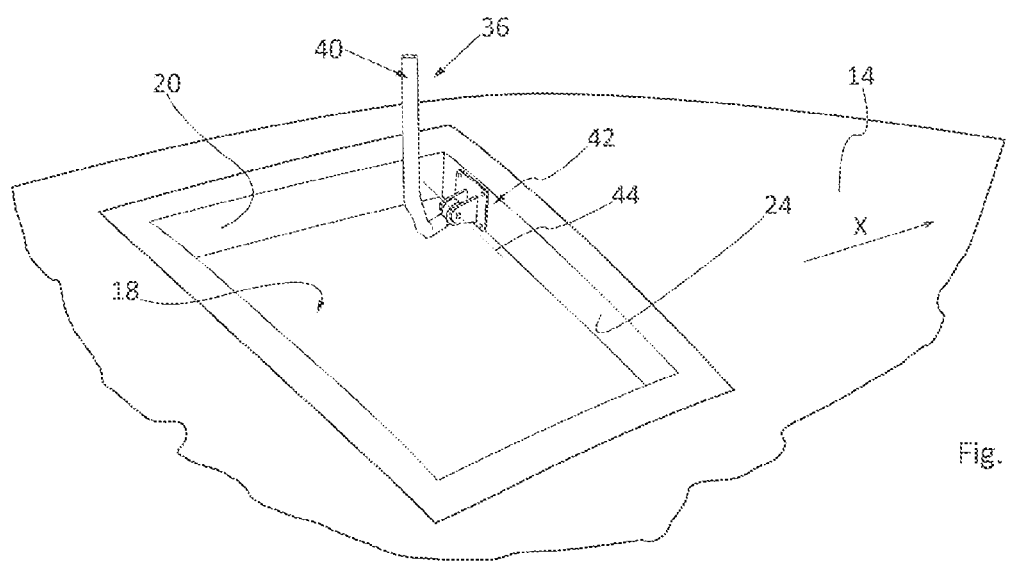
FIG. 2B is a diagrammatic representation in perspective of a support in a deployed position that illustrates the invention.

In FIGS. 1, 2A and 2B, there is represented a portion 10 of the fuselage of an aircraft, and more specifically its cockpit.

In known manner, the fuselage 10 includes a skin 12 as well as frames (not represented in the figures) disposed in transverse planes perpendicular to the longitudinal direction X of the fuselage. The skin delimits the exterior E and the interior I of the fuselage and includes an exterior surface 14 forming the exterior surface of the fuselage and an interior surface 16 fixed to the frames.

The aircraft further includes an opening 18 made in the skin 12 and which passes through said skin 12 in order to have the interior I and the exterior E of the fuselage 10 communicate.

The opening 18 is delimited by a frame. The opening is for example an emergency exit for the pilots of the aircraft.

In accordance with an embodiment shown in FIG. 1, the opening 18 is square or rectangular and the frame of the opening includes two longitudinal walls 20 and 22 parallel to the longitudinal direction X and two transverse walls 24 and 26 parallel to a transverse plane perpendicular to said longitudinal direction X.

In accordance with one embodiment, each transverse wall 24, 26 is part of an frame of the fuselage and each longitudinal wall 20, 22 is a stringer, substantially parallel to the longitudinal direction X, connecting the two frames of the fuselage that form the transverse walls 24, 26.

In accordance with a configuration shown in FIG. 1, the opening 18 is located above the cockpit of the aircraft and is slightly offset relative to the 12 o'clock generatrix of the cockpit. The frame of the opening therefore includes a top longitudinal wall 20 nearer the 12 o'clock generatrix than a bottom longitudinal wall 22 and a front transverse wall 24 nearer the nose of the aircraft than a rear transverse wall 26.

Of course, the invention is not limited to this geometry for the opening or to this installation area. Accordingly, the walls 20 to 26 are not necessarily plane.

The aircraft includes, in addition to the opening, a closure panel 28 (visible in FIG. 4A) mobile between a closed position in which it covers the opening 18 and an open position in which it uncovers the opening 18.

Figure 4A:
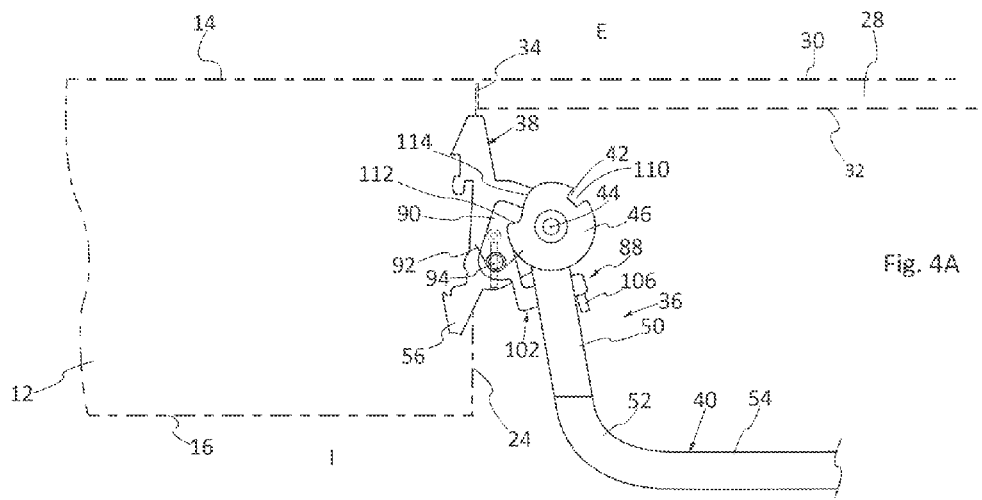
FIGS. 4A to 4C are side views of a deployable support respectively in the retracted position, during deployment and in the deployed position.
Figure 4B:
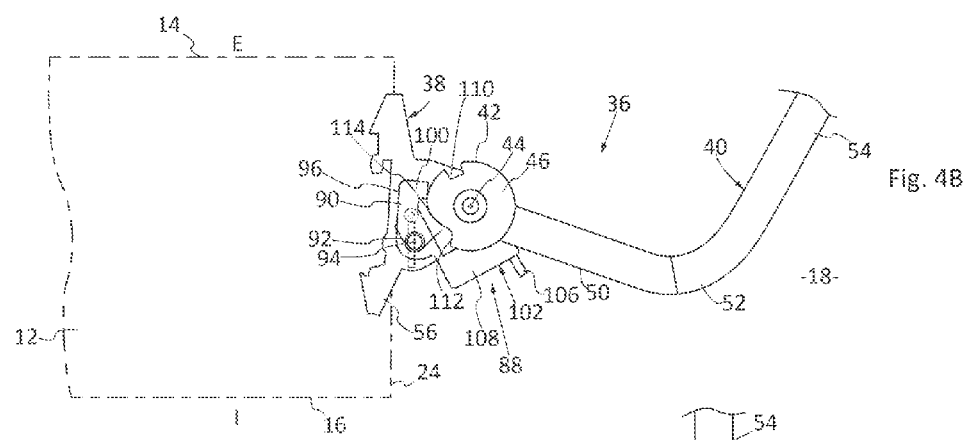

In accordance with an embodiment shown in FIG. 4A, the closure panel 28 has an exterior surface 30 that lines up with the exterior surface 14 of the fuselage in the closed position, an interior surface 32 offset toward the interior of the fuselage relative to the exterior surface 30, and at least one peripheral wall 34 the shapes of which are complementary to the frame of the opening 18. Sealing means are provided to produce an airtight connection between the closure panel 28 and the opening 18. Moreover, a locking and unlocking mechanism is provided to retain the panel in the closed position or to allow it to move to the open position.

The closure panel, the sealing means, the locking and unlocking mechanism, the articulation if any between the closure panel and the rest of the fuselage are not described further because they are known and can assume different configurations.

In accordance with one aspect of the invention, the opening 18 and the closure panel 28 can be dedicated exclusively to the emergency exit function or have other functions. Thus a portion of an aircraft windshield may constitute an emergency exit and one of the panes of the windshield may provide the closure panel function and be mobile to uncover an opening delimited by a frame of the windshield.

The aircraft includes a support 36 deployable outside the fuselage 10 via the opening 18 when the closure panel is in the open position.

For the purposes of the present application, there is meant by support any element on which a part of the body can rest such as for example a step or a hand-hold that can be gripped.

This support 36 includes a base 38 fastened to the fuselage 10, at least one bar 40 and an articulation 42 between the bar 40 and the base 38. Unlike a rung of a ladder, the bar 40 is connected at only one of its ends.

The bar 40 is mobile between a retracted position (visible in FIGS. 2A and 4A) in which it is disposed inside the fuselage 10 and a deployed position (visible in FIGS. 2B and 4C) in which it is deployed outside the fuselage and projects relative to the exterior surface 14 of the fuselage.

In accordance with one important feature of the invention, the articulation 42 is a pivoting connection. The fact that the articulation 42 pivots makes it possible to reduce the volume occupied by the support 36 in the opening 18 when the bar 40 is in the deployed position and to keep the opening as large as possible. Moreover, this solution is suitable for all areas for installing the opening in a fuselage of an aircraft.

The support 36 is advantageously disposed in one corner of the opening 18.

This feature makes it possible to retain the largest possible opening 18 when the bar 40 is in the deployed position.

The pivot axis 44 is preferably between the exterior surface 14 and the interior surface 16 of the fuselage so that the volume occupied by the bar inside the fuselage when in the retracted position is as small as possible.

In accordance with one embodiment, the bar 40 includes, from one end to the other, a head 46 connected to the base 38 by the pivot 44, a rectilinear first portion 50, a cranked second portion 52, and a rectilinear third portion 54.

In accordance with this configuration, the rectilinear third portion 54 is the part of the bar 40 that provides the support or grip function.

In accordance with one embodiment, this rectilinear third portion 54 is substantially perpendicular to the pivot axis 44 of the bar.

At least the portion of the bar 40 projecting outside the fuselage when in the deployed position advantageously includes a non-slip surface. In accordance with one embodiment, the rectilinear third portion 54 includes a non-slip coating.

In accordance with one embodiment, the rectilinear third part 54 has a round section. Other section shapes can be envisaged, however.

Figure 3:
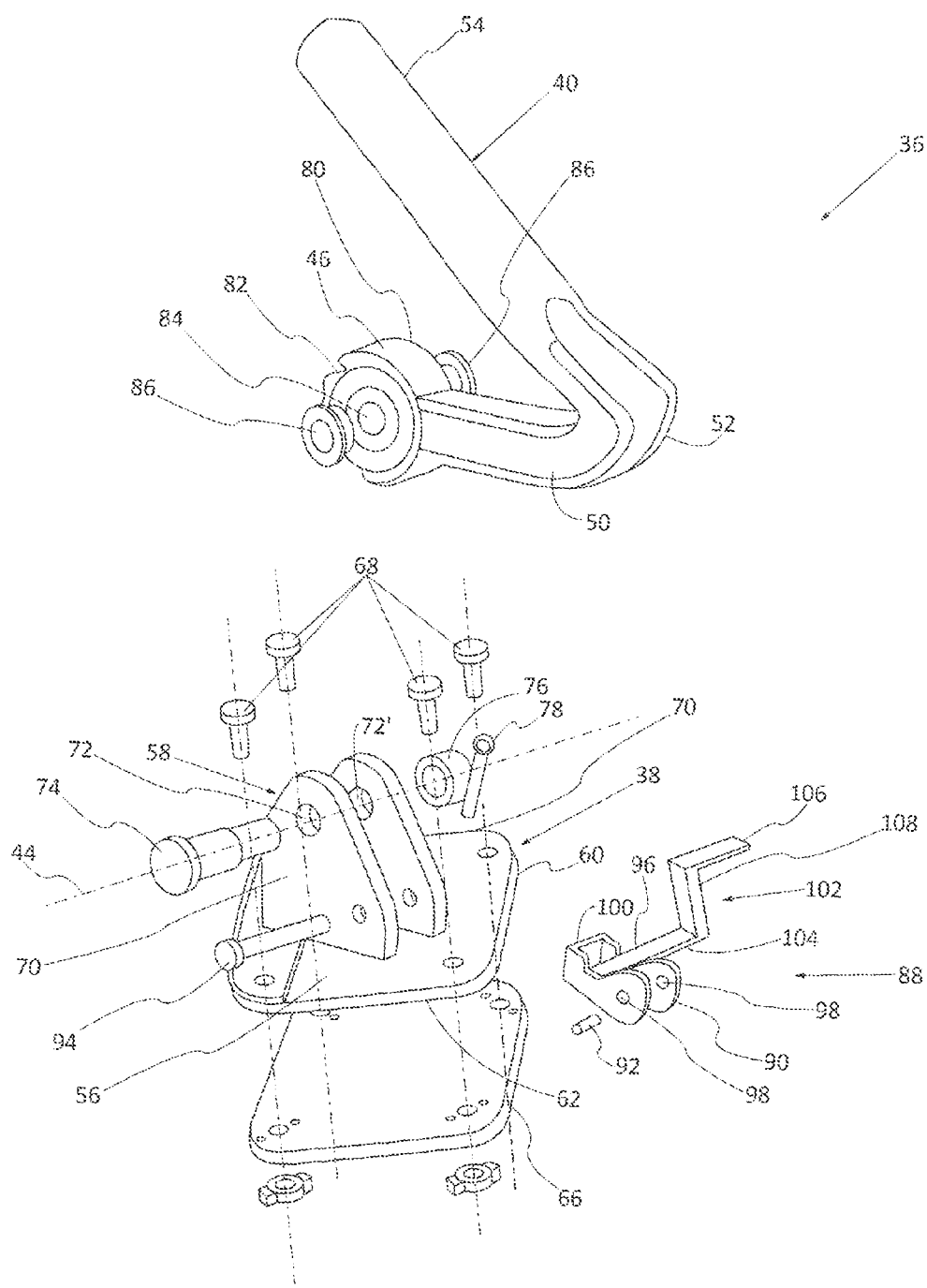
FIG. 3 is an exploded perspective view of the various parts of a support that illustrates one embodiment of the invention.

In accordance with an embodiment shown in FIG. 3, the base 38 includes a plate 56 and a yoke 58 fastened to a first face 60 of the plate 56, the second face 62 of the plate 56 being connected to the fuselage 10 by any appropriate means. It will be noted that, as shown in FIG. 3, the plate 56 is for example pressed against the frame of the opening 18.

The pivoting connection preferably has a pivot axis 44 parallel to the exterior surface 14 of the fuselage. In this case, the rectilinear first portion 50 and the cranked second portion 52 of the bar 40 have dimensions and geometries such that the rectilinear third portion 54 of the bar is approximately parallel to the closure panel 28 and offset toward the interior of the fuselage 10 relative to said interior surface 32, as shown in FIG. 4A. Thus when the support 36 is not being used it does not project excessively into the interior of the cockpit.

In accordance with one application, the plate 56 is connected to the front transverse wall 24 in the vicinity of the top longitudinal wall 20. The invention is not limited to this installation area, however.

In accordance with one embodiment, the support includes an intermediate plate 66 against which presses and to which is fixed the plate 56, for example by means of four bolts 68.

This intermediate plate 66 is fixed to the primary structure of the fuselage 10 by a connection conforming to the regulations.

Where the articulation 42 is concerned, the yoke 58 includes two parallel plates 70 with aligned holes 72, 72' through them that accommodate the pivot 44.

The plate 56 and the yoke 58 are preferably configured so that the pivot axis 44 of the bar is substantially parallel to the surface of the frame of the opening to which said plate 56 is fastened.

In accordance with one embodiment, the pivot 44 comprises a bolt with on the one hand a screw 74 with a head, a cylinder portion and a threaded portion and on the other hand a nut 76 with an anti-rotation system 78 (a pin that cooperates with the crenellated shapes of the nut).

In accordance with one embodiment, the head 46 of the bar includes an approximately cylindrical side wall 80 and two parallel end faces 82. The distance between the two end faces is approximately identical, ignoring the functional clearance, to the distance between the two plates 70 of the yoke 58 to limit any movement of the head 46 relative to the yoke 58 in the direction of the pivot axis 44.

The head 46 of the bar has a hole 84 through it that opens onto each end face 82, that is cylindrical and that has an axis substantially perpendicular to the end faces 82.

This through-hole 84 accommodates the pivot 44.

To favor the pivoting of the head 46 relative to the pivot, the articulation 42 advantageously includes at least one sliding ring 86 interleaved between the through-hole 84 and the pivot axis 44.

The support 36 advantageously includes a locking system 88 for retaining the bar 40 at least in the deployed position.

The locking system 88 is configured to occupy a locked state in which it immobilizes the bar 40 against rotation and an unlocked state in which it allows the rotation of the bar 40.

The locking system 88 includes a lever 90 with a projecting shape 100 and a return spring 92, said lever 90 being mobile between a position away from the head 46 of the bar that corresponds to the unlocked state and a position in contact with the head 46 of the bar, the return spring 92 urging the lever 90 into contact with the head 46 of the bar.

The lever 90 is preferably connected to the base 38 by a pivoting connection that has a hinge pin 94 parallel to the pivot axis 44 of the bar. In accordance with one embodiment, the hinge pin 94 is a pin supported by the yoke 58 and the return spring 92 is a torsion spring.

In accordance with one embodiment, the lever 90 includes a body 96 that is disposed between the two plates 70 of the yoke 58 and that has a hole 98 through it in which the hinge pin 94 is accommodated. The body 96 includes on one side of the hinge pin 94 the projecting shape 100 oriented toward the head 46 of the bar and on the other side of the hinge pin 94 a lug 102 that can be actuated by a user.

The lug 102 includes a first portion 104 that extends in a direction parallel to the hinge pin 94 so as to offset its end 106 relative to the bar 40 when the bar 40 is in the retracted position as shown in FIG. 4A. The lug 102 preferably includes an intermediate portion 108 interleaved between the first portion 104 and the end 106 that extends in a plane perpendicular to the hinge pin 94, the end 106 of the lug 102 being disposed in a plane parallel to the hinge pin 94. This configuration improves the ergonomics of the lever 90 for unlocking the locking system.

In addition to the lever 90, the head 46 of the bar 40 includes at least one notch 110 for the deployed position.

The notch 110 advantageously has shapes complementary to those of the projecting shape 100 of the lever 90 so as to immobilize the bar 40 against rotation in both rotation directions when it is in the deployed position.

In accordance with one embodiment, the notch 110 extends from one end face 82 to the other.

The notch 110 is located on the side wall 80 of the head 46 of the bar so that the projecting shape 100 of the lever 90 cooperates with the notch 110 when the bar 40 is in the deployed position.

The head 46 of the bar 40 advantageously includes at least one stop 112 for the retracted position. Unlike a notch, the stop 112 limits the movement in rotation of the bar 40 in one direction only, the direction from the deployed position toward the retracted position. This configuration allows the passage from the retracted position to the deployed position without having to maneuver the lever 90. Moreover, the stop 112 limits the movement in rotation of the bar toward the interior of the cockpit.

The stop 112 is located on the side wall 80 of the head 46 of the bar so that the projecting shape 100 of the lever 90 comes into contact with the stop 112 when the bar 40 is in the retracted position.

The side wall 80 preferably includes a ramp 114 that extends from the stop 112. This ramp 114 corresponds to an increase in the distance between the pivot axis 44 and the side wall 80 starting from the stop 112. This ramp 114 allows rotation of the bar 40 toward the deployed position by a user without actuating the lever 90. In parallel with this, the ramp 114 makes it possible to limit the movements in rotation of the bar 40 without the intervention of a person.

The use of the deployable support 36 is simple.

In the non-use position, the projecting shape 100 of the lever 90 is in contact with the stop 112. The bar 40 is in the retracted position, as shown in FIG. 4A.

In the event of evacuation, the closure panel 28 is unlocked to uncover the opening 18. Without it being necessary to maneuver the lever 90, a person grasps the bar 40 and pivots it toward the deployed position.

Figure 4C:
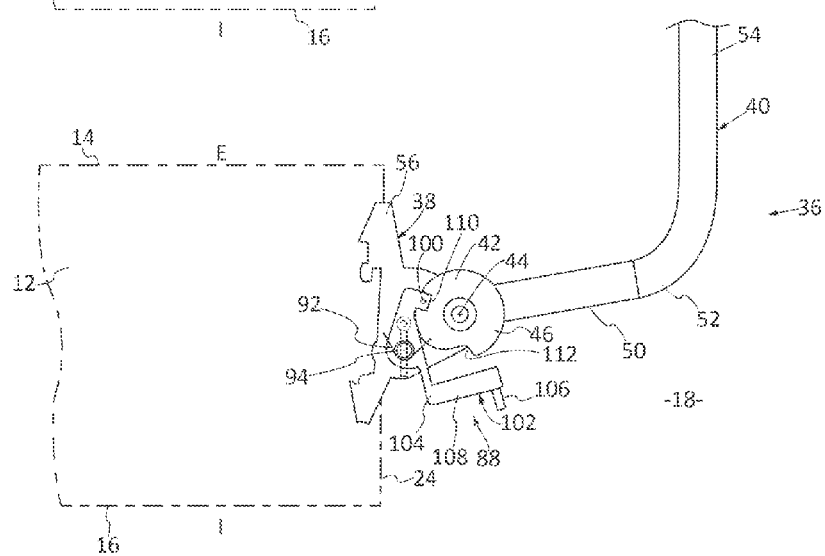

As soon as the bar 40 reaches the deployed position, the projecting shape 100 of the lever 90 engages in the notch 110. The locking system is in the locked state and immobilizes the bar 40 in the deployed position, as shown in FIG. 4C.

The person can exit the aircraft through the opening 18 and holding onto a rope or a flexible ladder until they reach the ground. The person has a support 36 available on the exterior of the fuselage to facilitate passing through the opening.

Given its kinematic for its deployment, the deployable support 36 does not encroach too much on the opening. Moreover, it is suitable for emergency exits located in the upper part or on the sides of the fuselage of an aircraft.

To reposition the bar 40 in the retracted position, a person grips and pulls with one hand the end 106 of the lug 102 so as to pivot the lever 90. As a result, the projecting shape 100 moves away from the notch 110 of the head 46. The locking mechanism is in the unlocked state. The person can then grasp the bar 40 and pivot it toward the retracted position. They can then release the lever 90, which comes back into contact with the head 46, outside the notch 110, because of the force exerted by the return spring 92.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
 a fuselage with a skin in which is made an opening, the skin delimiting the interior and the exterior of the fuselage,
 a closure panel mobile between a closed position and an open position in which said closure panel uncovers the opening and
 a support including a base fastened to the fuselage,
 at least one bar and an articulation between said at least one bar and said base allowing the at least one bar to occupy a position retracted inside the fuselage and a position deployed outside the fuselage,
 wherein the articulation is a pivoting connection, wherein said at least one bar is joined by said pivoting connection and wherein said at least one bar is free from connection to the closure panel when in the deployed position.

2. The aircraft as claimed in claim 1, wherein the pivoting connection has a pivot axis parallel to an exterior surface of the fuselage.

3. The aircraft as claimed in claim 1, wherein the support is disposed in a corner of the opening.

4. The aircraft as claimed in claim 1, wherein the support includes a locking system configured to occupy a locked state in which it immobilizes the at least one bar in rotation and an unlocked state in which it allows the rotation of the at least one bar.

5. The aircraft as claimed in claim 4, wherein the at least one bar includes a head connected to the base by the pivot, said head including at least one notch for the deployed position and wherein the locking system includes a lever with a projecting shape that cooperates with the notch of the head when the at least one bar is in the deployed position, said lever being mobile between a position away from the head of the at least one bar that corresponds to the unlocked state and a position in contact with the head of the at least one bar.

6. The aircraft as claimed in claim 5, wherein the head includes at least one stop for the retracted position.

7. The aircraft as claimed in claim 5, wherein the locking system includes a return spring urging the lever into contact with the head of the at least one bar.

8. The aircraft as claimed in claim 5, wherein the lever is connected to the base by a hinge pin parallel to the pivot axis of the at least one bar and wherein the lever includes a lug with a first portion that extends in a direction parallel to the hinge pin, an intermediate portion that extends in a plane perpendicular to the hinge pin and an end that extends in a plane parallel to the hinge pin.

9. The aircraft as claimed in claim 1, wherein the pivot axis of the at least one bar is between an exterior surface and an interior surface of the fuselage.

10. The aircraft as claimed in claim 9, wherein the at least one bar comprises:
 a head connected to the base by the pivot,
 a rectilinear first portion,
 a cranked second portion and
 a rectilinear third portion,
 the rectilinear first portion and the cranked second portion of the at least one bar having dimensions and geometries such that the rectilinear third portion of the at least one bar is parallel to the closure panel.

11. An aircraft comprising:
 a fuselage with a skin in which is made an opening, the skin delimiting the interior and the exterior of the fuselage,
 a closure panel mobile between a closed position and an open position in which said closure panel uncovers the opening and
 a support including a base fastened to the fuselage,
 at least one bar and an articulation between said at least one bar and said base allowing the at least one bar to occupy a position retracted inside the fuselage and a position deployed outside the fuselage,
 wherein the articulation is a pivoting connection,
 wherein the support includes a locking system configured to occupy a locked state in which it immobilizes the at least one bar in rotation and an unlocked state in which it allows the rotation of the at least one bar,
 wherein the at least one bar includes a head connected to the base by the pivot, said head including at least one notch for the deployed position and wherein the locking system includes a lever with a projecting shape that cooperates with the notch of the head when the at least one bar is in the deployed position, said lever being mobile between a position away from the head of the at least one bar that corresponds to the unlocked state and a position in contact with the head of the at least one bar.

12. An aircraft comprising:
 a fuselage with a skin in which is made an opening, the skin delimiting the interior and the exterior of the fuselage,
 a closure panel mobile between a closed position and an open position in which said closure panel uncovers the opening and
 a support including a base fastened to the fuselage,
 at least one bar and an articulation between said at least one bar and said base allowing the at least one bar to occupy a position retracted inside the fuselage and a position deployed outside the fuselage,
 wherein the articulation is a pivoting connection,
 wherein the pivot axis of the at least one bar is between an exterior surface and an interior surface of the fuselage,
 wherein the at least one bar comprises:
  a head connected to the base by the pivot,
  a rectilinear first portion,
  a cranked second portion and
  a rectilinear third portion,
  the rectilinear first portion and the cranked second portion of the at least one bar having dimensions and geometries such that the rectilinear third portion of the at least one bar is parallel to the closure panel.

* * * * *